(12) United States Patent
Kang et al.

(10) Patent No.: US 10,250,738 B2
(45) Date of Patent: Apr. 2, 2019

(54) SCHEDULE MANAGEMENT DEVICE AND METHOD THEREFOR

(71) Applicant: Samsung Electronics Co., Ltd., Suwon-si, Gyeonggi-do (KR)

(72) Inventors: Fengxia Kang, Jiangsu (CN); Siqun Yang, Jiangsu (CN); Sugang Tian, Jiangsu (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/160,447

(22) Filed: May 20, 2016

(65) Prior Publication Data

US 2016/0269543 A1    Sep. 15, 2016

Related U.S. Application Data

(63) Continuation of application No. PCT/KR2014/012802, filed on Dec. 24, 2014.

(30) Foreign Application Priority Data

Dec. 25, 2013    (CN) .......................... 2013 1 0724639

(51) Int. Cl.
*H04M 1/725* (2006.01)
*G06Q 10/10* (2012.01)
(Continued)

(52) U.S. Cl.
CPC .... *H04M 1/72572* (2013.01); *G06F 16/9537* (2019.01); *G06F 21/554* (2013.01);
(Continued)

(58) Field of Classification Search
CPC .............. G06F 17/3087; G06F 21/554; G06F 21/6227; G06F 2221/2111; G06F 16/9537;
(Continued)

(56) References Cited

U.S. PATENT DOCUMENTS 7,327,834 B1 *  2/2008  Hiers ...................... H04L 12/66
                                              379/88.13
7,764,954 B2    7/2010  Beyer, Jr.
(Continued)

FOREIGN PATENT DOCUMENTS

| CN | 1500239 A | 5/2004 |
|---|---|---|
| CN | 1805593 A | 7/2006 |

(Continued)

*Primary Examiner* — Nathan S Taylor
(74) *Attorney, Agent, or Firm* — Jefferson IP Law, LLP

(57) ABSTRACT

Provided is a method of managing a schedule in a mobile device, the method including: receiving information of the event and a first user input of location information related to the event; storing the received information of the event and the location information related to the event; searching for location information matching a second user input of location information from the stored location information related to the event on the basis of the second user input; and if the searched for location information is found, outputting the information of the event about the found location information.

17 Claims, 12 Drawing Sheets

(51) Int. Cl.
  *H04W 4/021*    (2018.01)
  *G06F 21/55*    (2013.01)
  *G06F 21/62*    (2013.01)
  *H04W 4/02*     (2018.01)
  *G06F 16/9537*  (2019.01)
  *H04W 4/029*    (2018.01)

(52) U.S. Cl.
  CPC ..... *G06F 21/6227* (2013.01); *G06Q 10/1093* (2013.01); *H04M 1/72566* (2013.01); *H04W 4/022* (2013.01); *H04W 4/025* (2013.01); *G06F 2221/2111* (2013.01); *H04M 2250/10* (2013.01); *H04W 4/029* (2018.02)

(58) Field of Classification Search
  CPC .......... G06Q 10/1093; H04M 1/72566; H04M 1/72572; H04M 2250/10; H04W 4/022; H04W 4/025; H04W 4/028; H04W 4/029
  USPC ...................................... 455/414.2
  See application file for complete search history.

(56) References Cited

U.S. PATENT DOCUMENTS

| | | | |
|---|---|---|---|
| 7,864,073 B2 | 1/2011 | Lee et al. | |
| 9,307,033 B1* | 4/2016 | Meschkat | H04L 67/18 |
| 2002/0068583 A1* | 6/2002 | Murray | H04M 3/432 455/456.3 |
| 2003/0182052 A1* | 9/2003 | DeLorme | G01C 21/26 701/533 |
| 2004/0104937 A1 | 6/2004 | An | |
| 2005/0216531 A1 | 9/2005 | Blandford | |
| 2006/0077055 A1* | 4/2006 | Basir | G06Q 10/109 340/539.13 |
| 2006/0208861 A1* | 9/2006 | Stroupe | G06Q 10/109 340/309.7 |
| 2007/0124371 A1* | 5/2007 | Desai | G06Q 10/107 709/204 |
| 2007/0174404 A1* | 7/2007 | Hui | G06Q 10/109 709/207 |
| 2007/0266342 A1 | 11/2007 | Chang et al. | |
| 2008/0161027 A1* | 7/2008 | Benco | G06Q 10/10 455/466 |
| 2009/0029724 A1* | 1/2009 | Hardy | G06Q 10/109 455/466 |
| 2009/0106365 A1* | 4/2009 | Drory | H04L 51/34 709/206 |
| 2009/0134991 A1* | 5/2009 | Shuart | H04L 12/5855 340/457 |
| 2009/0183096 A1* | 7/2009 | Edelen | G06Q 10/107 715/764 |
| 2009/0235280 A1* | 9/2009 | Tannier | G06Q 10/00 719/318 |
| 2010/0103779 A1* | 4/2010 | Kakirde | G06Q 10/109 368/10 |
| 2010/0159978 A1* | 6/2010 | Sierawski | H04M 1/72519 455/550.1 |
| 2010/0223089 A1* | 9/2010 | Godfrey | G06Q 10/109 705/7.19 |
| 2010/0231364 A1* | 9/2010 | Laine | H04L 51/38 340/309.7 |
| 2011/0047483 A1* | 2/2011 | Low | H04L 51/30 715/752 |
| 2011/0076989 A1* | 3/2011 | Lynch | H04M 1/72547 455/412.1 |
| 2011/0106892 A1* | 5/2011 | Nelson | G06Q 10/109 709/206 |
| 2011/0239158 A1* | 9/2011 | Barraclough | G06Q 10/109 715/808 |
| 2011/0320548 A1* | 12/2011 | Jonsson | G06F 3/0237 709/206 |
| 2012/0142322 A1 | 6/2012 | Gomez | |
| 2012/0143961 A1* | 6/2012 | Jonsson | G06Q 10/1093 709/206 |
| 2012/0239761 A1* | 9/2012 | Linner | G06F 17/2765 709/206 |
| 2013/0007648 A1* | 1/2013 | Gamon | G06Q 10/109 715/771 |
| 2013/0110940 A1* | 5/2013 | Pasquero | H04M 1/72552 709/206 |
| 2013/0262530 A1* | 10/2013 | Collins | G06Q 40/08 707/812 |
| 2014/0070945 A1* | 3/2014 | Dave | G06Q 10/109 340/540 |
| 2014/0173009 A1* | 6/2014 | Denise | G06Q 10/107 709/206 |
| 2014/0310162 A1* | 10/2014 | Collins | G06F 3/04842 705/39 |
| 2015/0005010 A1* | 1/2015 | Zhang | H04W 4/023 455/456.3 |
| 2015/0045004 A1* | 2/2015 | Varadharajan | H04W 4/12 455/412.2 |
| 2015/0207926 A1* | 7/2015 | Brown | H04M 1/72597 455/414.1 |

FOREIGN PATENT DOCUMENTS

| | | |
|---|---|---|
| CN | 1889113 A | 1/2007 |
| CN | 101025739 A | 8/2007 |
| CN | 101287215 A | 10/2008 |
| CN | 102654848 A | 9/2012 |
| CN | 102970654 A | 3/2013 |
| CN | 103220412 A | 7/2013 |
| EP | 0 999 508 A1 | 5/2000 |
| JP | 2004-271335 A | 9/2004 |
| KR | 10-2005-0045465 A | 5/2005 |
| KR | 10-2005-0093210 A | 9/2005 |
| KR | 10-2008-0064556 A | 7/2008 |
| KR | 10-1104465 B1 | 1/2012 |
| KR | 10-2012-0052674 A | 5/2012 |
| KR | 10-1216424 B1 | 12/2012 |

* cited by examiner

SCHEDULE MANAGEMENT DEVICE AND METHOD THEREFOR

CROSS-REFERENCE TO RELATED APPLICATION(S)

This application is a continuation application of International application PCT/KR2014/012802 filed on Dec. 24, 2014, which claimed priority to a Chinese patent application filed on Dec. 25, 2013 in the Chinese Patent Office and assigned Serial No. 201310724639.X, the entire disclosure of which is hereby incorporated by reference.

TECHNICAL FIELD

Embodiments of the present disclosure relate to a schedule management device and a method therefor.

BACKGROUND ART

With the increased general use of mobile devices, schedule management applications such as calendar applications and diary applications have become widely used in the mobile devices.

However, conventional schedule management applications store and search for events in a time-based manner. Thus, although a schedule of a prearranged event is easily recognized, location information thereof such as information about a location where the event takes place and a route from a current location to the location where the event takes place needs to be separately searched for using a map application, or the like.

SUMMARY

An aspect of the present disclosure provides a schedule management device that stores and searches for events based on time and location and a method therefor.

According to an aspect of the present disclosure, there is provided a method of managing a schedule in a mobile device, the method including: receiving information of an event and a first user input of location information related to the event; storing the received information of the event and location information related to the event; searching for location information matching a second user input of location information from the stored location information related to the event on the basis of the second user input; and if the searched for location information is found, outputting the information of the event about the found location information.

According to an aspect of the present disclosure, there is provided a device for managing a schedule in a mobile device, the device including: an input interface configured to receive information of an event and a first user input of location information related to the event; a storage configured to store the received information of the event and the location information related to the event; a processor configured to search for location information matching a second user input of location information from the stored location information related to the event on the basis of the second user input; and an output interface configured to, if the searched location information is found, output the information of the event about the found location information.

DETAILED DESCRIPTION

Figure 1:
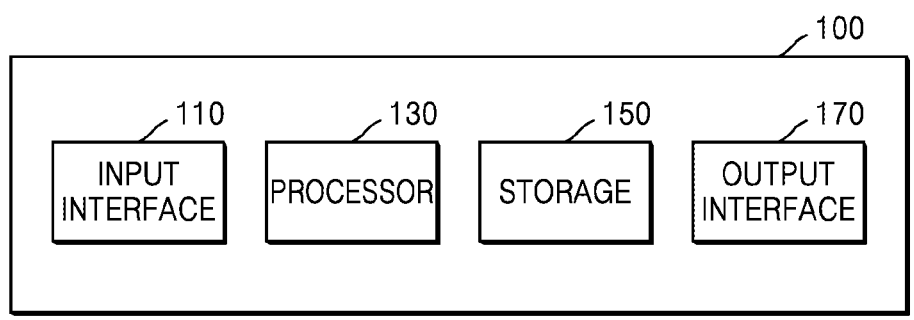
FIG. 1 is a block diagram illustrating a schedule management device implemented according to an embodiment of the present disclosure.

According to an aspect of the present disclosure, there is provided a method of managing a schedule in a mobile device, the method including: receiving information of an event and a first user input for location information related to the event; storing the received information of the event and location information related to the event; searching for location information matching a second user input of location information from the stored location information related to the event on the basis of the second user input; and if the searched for location information is found, outputting the information of the event about the found location information.

The information of the event may include a date and time of an event, the searching may further include determining whether a current time is the same as the date and time of the event, and if it is determined that the current time is the same as the date and time of the event and the found location information exists, the outputting includes outputting the information of the event about the found location information.

The location information related to the event may indicate information about a location where the event takes place.

The first user input and the second user input of location information may be performed by a user using a method of selecting a location on a displayed map or by a method of acquiring a real-time location of the user through a global positioning system (GPS).

The searching for the matched location information may be performed by replacing the received second user input with a minimum quadrangle including the received second user input, and searching for location information matching the minimum quadrangle from the stored location information.

The outputting may include outputting an activity route for the event on a map.

The information of the event may include reminding information about the event, the second user input may be received via a method of acquiring real-time location information through a GPS, and the outputting may include outputting the reminding information about the event.

The information of the event may include reminding information about the event and information about a reminding date and time, the second user input may be received via a method of acquiring real-time location information of a user through a GPS, the searching may include determining whether a current time has passed the reminding date and time and searching for information of the event, the stored location information of which matches with the acquired real-time location information of the user, and the outputting may include outputting the reminding information about the event if the current time has passed the reminding date and time, or if it is determined that the acquired real-time location information of the user matches the stored location information.

The location information related to the event may indicate information about a location where the reminding information is provided.

According to another embodiment of the present disclosure, there is provided a schedule management device operating in a mobile device, the schedule management device including: an input interface configured to receive information of an event, a first user input of location information related to the event, and a second user input of location information; a storage configured to store the received information of the event and location information related to the event; a processor configured to search for location information matching the second user input from location information stored in the storage on the basis of the second user input of location information; and an output interface configured to, if the searched for location information is found, output the information of the event about the found location information.

The information of the event may include a date and time of the event, the processor may determine whether a current time is the same as the date and time of the event, and if it is determined that the current time is the same as the date and time of the event and the searched for location information is found, the output interface outputs the information of the event about the found location information.

The location information related to the event may indicate information about a location where the event takes place.

The first user input and the second user input of location information may be performed by a user using a method of selecting a location on a displayed map or by a method of acquiring a real-time location of the user through a GPS.

The processor may replace the received second user input with a minimum quadrangle including the received second user input, and search for location information matching the minimum quadrangle from the stored location information.

The output interface may output an activity route for the event.

The information of the event may include reminding information about the event, the second user input may be received via a method of acquiring real-time location information of a user through a GPS, and the output interface may output the reminding information about the event.

The information of the event may include reminding information about the event and information about a reminding date and time, the second user input may be received via a method of acquiring real-time location information of a user through a GPS, the processor may determine whether a current time has passed the reminding date and time and searches for information of the event, the stored location information of which matches the acquired real-time location information of the user, and the output interface may output the reminding information about the event if the current time has passed the reminding date and time, or if it is determined that the acquired real-time location information of the user matches the stored location information.

The location information related to the event may indicate information about a location where the reminding information is provided.

According to another embodiment of the present disclosure, there is provided a computer readable recording medium in which a program configured to implement the method of managing a schedule is recorded.

The advantages and features of the embodiments of the present disclosure and the way of attaining them will become apparent with reference to embodiments described below in detail in conjunction with the accompanying drawings. The embodiments of the present disclosure, however, may be embodied in many different forms and should not be constructed as being limited to example embodiments set forth herein. Rather, these example embodiments are provided so that this disclosure will be through and complete and will fully convey the scope to those of ordinary skill in the art. The scope of the present disclosure should be defined by the claims.

Hereinafter, the terms used in the specification will be briefly described, and then the present disclosure will be described in detail.

The terms used in this specification are general terms currently widely used in the art in consideration of functions in regard to the present disclosure, but the terms may vary according to the intention of those of ordinary skill in the art, precedents, or new technology in the art. Also, specified terms may be selected by the applicant, and in this case, the detailed meaning thereof will be described in the detailed description of the present disclosure. Thus, the terms used in the specification should be understood not as simple names but based on the meaning of the terms and the overall description of the invention.

Throughout the specification, the term "include" in relation to an element does not preclude other elements but may further include an element, unless stated otherwise. In addition, the term "unit" as used herein, refers to, but is not limited to, a software component or a hardware component such as a field programmable gate array (FPGA) or application specific integrated circuit (ASIC) and performs certain tasks. A unit may be configured to reside on an addressable storage medium and be executed on one or more processors. Thus, a unit may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and units may be combined into fewer components and units or further separated into additional components and units.

Throughout the specification, a mobile device refers to a relatively small-sized computer device portable by users such as a cellular phone, a personal digital assistant (PDA), and a notebook computer.

Hereinafter, the present disclosure will be described in detail by explaining exemplary embodiments of the invention with reference to the attached drawings. In the drawings, parts unrelated to the descriptions are omitted so as not to obscure the description of the invention.

FIG. 1 is a block diagram illustrating a schedule management device implemented according to an embodiment of the present disclosure.

A schedule management device 100 may be an element constituting a part of a mobile device such as cellular phone, a PDA, or a notebook computer, or may be a separately existing independent mobile device.

The schedule management device 100 may include an input interface 110, a processor 130, a storage 150, and an output interface 170.

The input interface 110 may receive information of an event, a first user input of location information related to an event, a second user input of location information, and the like.

As used herein, the information of the event may include at least one of a title, contents, a date, a time, and a location of an event, preparations therefor, whether to remind about the event, a reminding date and time, a reminding location, a reminding interval, a reminding method, and other notes about the event.

Also, the location information related to the event may include at least one of information about a location where the event takes place, a location where a reminder is provided when the user is reminded about the event, information about surroundings of the location where the event takes place, and other location information related to the event.

The input interface 110 may include at least one input device such as a touchscreen, a mouse, a keyboard, and various sensors. Inputting of information via the input interface 110 may be manually performed by the user or automatically performed by the mobile device.

A user input of location information may be performed by the user using a method of selecting a location on a displayed map or may be a method of acquiring a real-time location of the user through a global positioning system (GPS).

The storage 150 may store information of the event and location information related to the event received from the user or inner or outer devices.

The storage 150 may be a volatile memory, a non-volatile memory, an internal memory, an external memory, or any combination thereof. For example, the storage 150 may be a non-volatile memory such as a non-volatile random access memory (NVRAM), a flash memory, and a disk device or a volatile device such as a static random access memory (SRAM).

According to an embodiment, the storage 150 may include a storage interface used to communicate with another unit and an external device. The storage interface may receive information from another unit or an external transmitter or may also transmit information to another unit or an external target.

The processor 130 may search for location information matching a second user input from location information stored in the storage 150 on the basis of the second user input of location information.

Also, the processor 130 may search for location information matching the second user input from location information stored in the storage 150 on the basis of the second unit input of time information.

The processor 130 may also search for location information matching the second user input from location information stored in the storage 150 on the basis of the second unit input of location and time information.

In addition, the processor 130 may search for information of the event associated with the searched location information.

The output interface 170 may display a graphic user interface (GUI) of the schedule management device 100 on a panel. Also, the output interface 170 may display information of the event acquired by searching a database based on a date and time, a location, or all dates, times, and locations designated by the user.

Although the input interface 110, the processor 130, the storage 150, and the output interface 170 are described as separate constituent elements according to the present embodiment, the input interface 110, the processor 130, the storage 150, and the output interface 170 may also be integrated as one constituent element according to an embodiment.

In addition, although the input interface 110, the processor 130, the storage 150, and the output interface 170 are described as constituent elements located adjacent to each other in the schedule management device 100 according to the present embodiment, devices for performing functions of the respective input interface 110, the processor 130, the storage 150, and the output interface 170 do not need to be physically adjacent to each other. Thus, the input interface 110, the processor 130, the storage 150, and the output interface 170 may be arranged in various ways according to embodiments.

In addition, since the schedule management device 100 is not limited to physical devices, some of the functions of the schedule management device 100 may be implemented using software instead of hardware.

Figure 2:
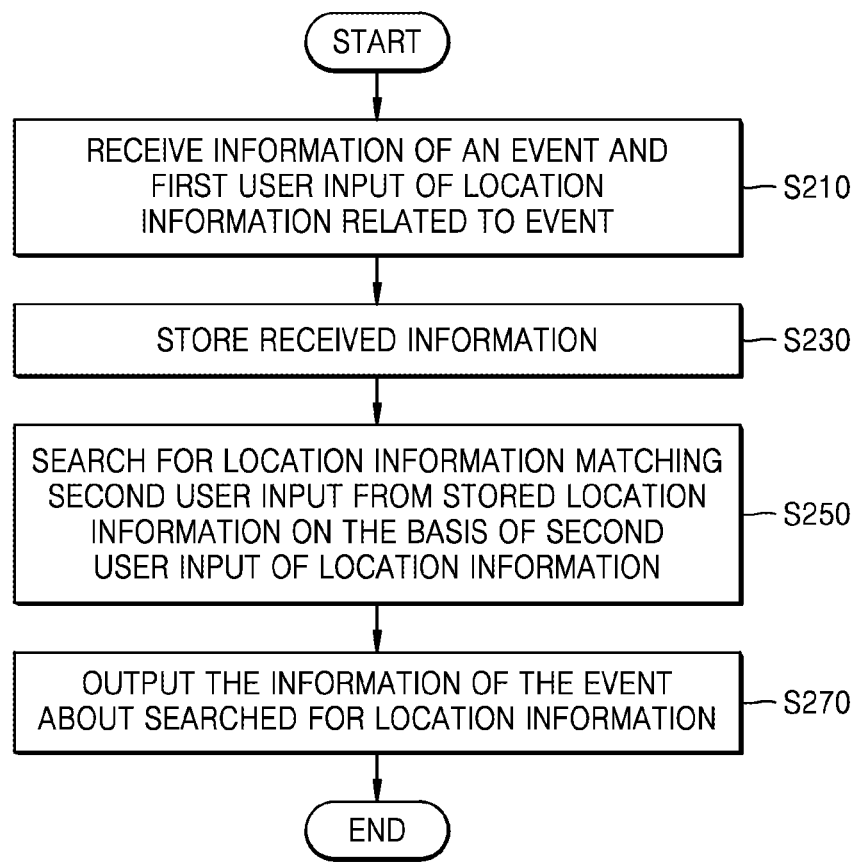
FIG. 2 is a flowchart illustrating a schedule management method according to an embodiment of the present disclosure.

FIG. 2 is a flowchart illustrating a schedule management method realized according to an embodiment of the present disclosure.

In operation S210, the schedule management device 100 may receive information of an event and a first user input of location information related to the event.

The information of the event may include at least one of title, contents, date, time, and location of an event, preparations therefor, whether to remind about the event, a reminding date and time, a reminding location, a reminding interval, a reminding method, and other notes about the event.

The title and contents of the event, preparations therefor, reminding contents, other notes about the event, and the like may be received via a text input device, the date and time of the event, the reminding date and time, and the like may be received through a calendar application, a clock application, or the like, and the location of the event and location of the reminder may be received through a map application.

The first user input of location information related to the event may be received in the form of a specific spot or a range.

The first user input of location information related to the event may be performed by the user using a method of selecting a location on a displayed map or by a method of acquiring a real-time location of the user through a GPS.

In operation S230, the schedule management device 100 may store the received information of the event and location information related to the event.

The schedule management device 100 may store a plurality of pieces of information of the event and respective location information related to the event in a database.

The schedule management device 100 may store at least one information, about one event, selected from the group consisting of a title, contents, a date, a time, and a location of the event, preparations therefor, whether to remind about the event, a reminding date and time, a reminding location, a reminding interval, reminding contents, and other notes about the event.

Also, the schedule management device 100 may store at least one, about location information related to the event, selected from the group consisting of information about the location where the event takes place, if the user is reminded about the event, a location where the reminder is provided, information about surroundings of the location where the event takes place, and other location information related to the event.

The location information may be stored as a latitude and longitude.

The schedule management device 100 may receive and store images, audio files, or video files related to the event.

In this regard, while text information is directly stored in the database, multimedia information may not be directly stored in the database. Instead, a route to the multimedia information may be directly stored in the database.

In operation S250, the schedule management device 100 may search for location information matching the second user input from the stored location information on the basis of the second user input of location information.

The schedule management device 100 may receive the second user input of location information from the user.

The second user input for location information may be received in the form of a specific spot or a range.

The second user input of location information may be performed by the user using a method of selecting a location on a displayed map or by a method of acquiring a real-time location of the user through a GPS.

According to an embodiment, the schedule management device 100 may receive a second user input of time information from the user.

The schedule management device 100 may receive a specific date or specific location from the user as the second user input and search for the stored information of the event and location information related to the event with respect to the received date or location.

In the case of receiving the second user input of a specific location and searching for information of the event and location information related to the event with respect to the specific location, the schedule management device 100 may have basic settings of searching for information about events arranged in the future.

According to an embodiment, in the case of receiving the second user input of a specific location and searching for information of the event and location information related to the event with respect to the specific location, the schedule management device 100 may have settings of searching for information only about events arranged in the past or information about all events regardless of time, or may receive an input to set target information of the event, from the user via a UI, among information about events arranged in the past, present, and future.

According to an embodiment, the schedule management device 100 may search for information matching the second user input from the stored information of the event by taking into consideration the second user input of other information of the event in addition to the location information.

For example, the schedule management device 100 may receive location information and time information as the second user inputs and search for data, the location information and time information of which match therewith, from the store information of the event.

The schedule management device 100 may receive a date range or a location range from the user as the second user inputs and search the stored information of the event and location information related to the event.

In operation S270, the schedule management device 100 may output information of the event about the searched location information.

If information matching the second user input is found from the information of the event and location information related to the event stored in operation S230, the schedule management device 100 may output the found information and related information. If the found information includes an activity route about the event, the schedule management device 100 may output the activity route about the event on a map.

Figure 3:
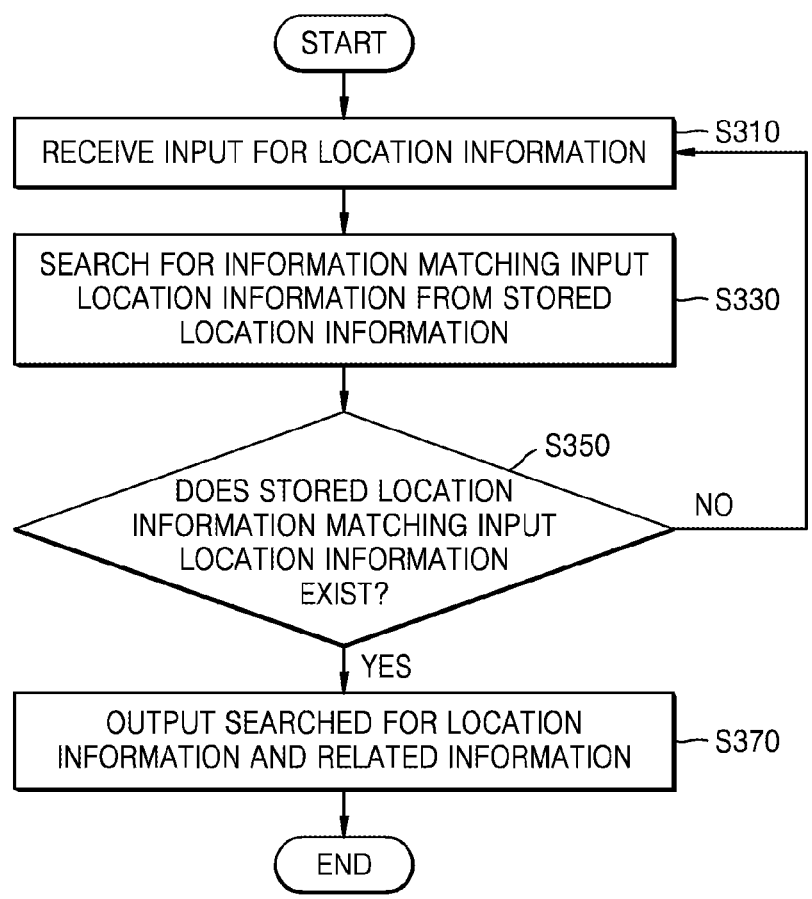
FIG. 3 is a flowchart illustrating a method of matching location information input by a user with location information stored in a database according to an embodiment of the present disclosure.

FIG. 3 is a flowchart illustrating a method of matching location information input by a user with location information stored in a database, according to an embodiment of the present disclosure.

FIG. 3 is a flowchart for describing the operation S250 of FIG. 2 in more detail.

In operation S310, the schedule management device 100 may receive a user input of location information from the user. The input for location information may be received in the form of a specific spot or a range.

The user input of location information may be performed by the user using a method of selecting a location on a displayed map or by a method of acquiring a real-time location of the user through a GPS.

In operation S330, the schedule management device 100 may search for information matching the input location information from the stored location information. The input location information may be matched with location information stored in the database by using various algorithms. These algorithms will be described later in FIG. 4.

The schedule management device 100 may have basic settings of searching for only information about events arranged to take place in the future.

In addition, the schedule management device 100 may set target events, such that it searches for only information about events that have been arranged in the past or searches for information about all events regardless of time, or may receive an input of setting target events, from the user via a UI, among the events arranged in the past, present, and future.

If stored location information matching the input location information exists (S350), the schedule management device 100 may output the searched location information and related information (S370).

If stored location information matching the input location information does not exist (S350), the schedule management device 100 may perform the operation S310 again. That is, if stored location information matching the input location information does not exist (S350), the schedule management device 100 may receive a new input for location information from the user and search for location information that matches therewith from the stored location information again.

Figure 4:
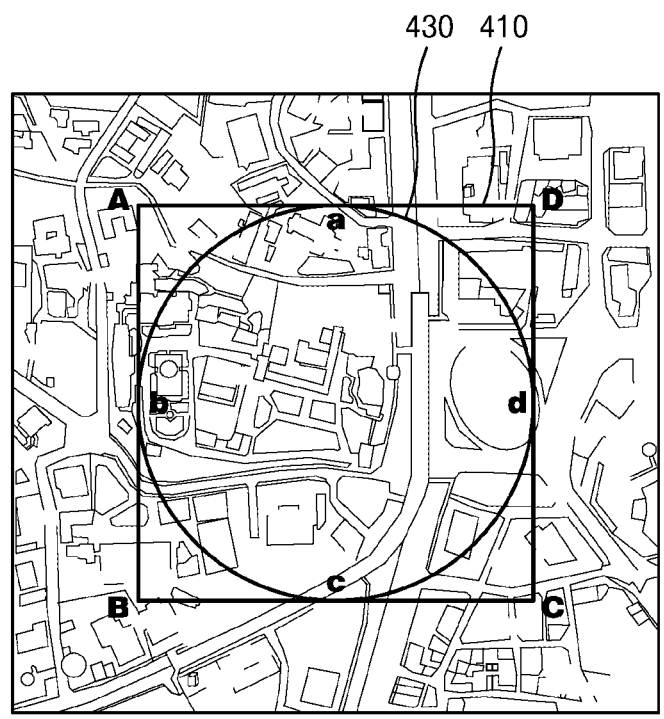
FIG. 4 is a diagram for describing an algorithm of the schedule management device for matching an input with location information stored in a database by applying a quadrangle to a map, based on a received location range into a quadrangle according to an embodiment of the present disclosure.

FIG. 4 is a diagram for describing an algorithm of the schedule management device for matching a received location range with location information stored in a database by applying a quadrangle to a map, based on the received location range, according to an embodiment of the present disclosure.

The schedule management device 100 may receive, from the user, an input designating a range in the shape of a circle 430 on a displayed map.

Since the user input does not always have a constant shape, the schedule management device 100 may replace the received user input range with a minimum quadrangle including the received user input range and search for location information matching the quadrangular range from the stored location information.

For example, if the user input range is in the shape of the circle 430 on the map, the schedule management device 100 may draw tangential lines of upper, lower, right, and left points a, b, c, and d of the circle 430 and acquire a quadrangle 410 having points of intersections of the lines as vertexes A, B, C, and D.

Although this algorithm for matching a non-uniform user input range with the stored location information by replacing the user input range with a quadrangle may have reduced accuracy due to the difference between the user input range and the quadrangle, a search speed may be increased.

If the user input range is complicated and non-uniform, it may be difficult to replace the user input range with one quadrangle. In this case, the schedule management device 100 may apply a plurality of quadrangles having different sizes and perform the search.

The method of matching the input location information with the location information stored in the database is not limited to the algorithm described above, and other various algorithms may also be used therefor.

Figure 5:
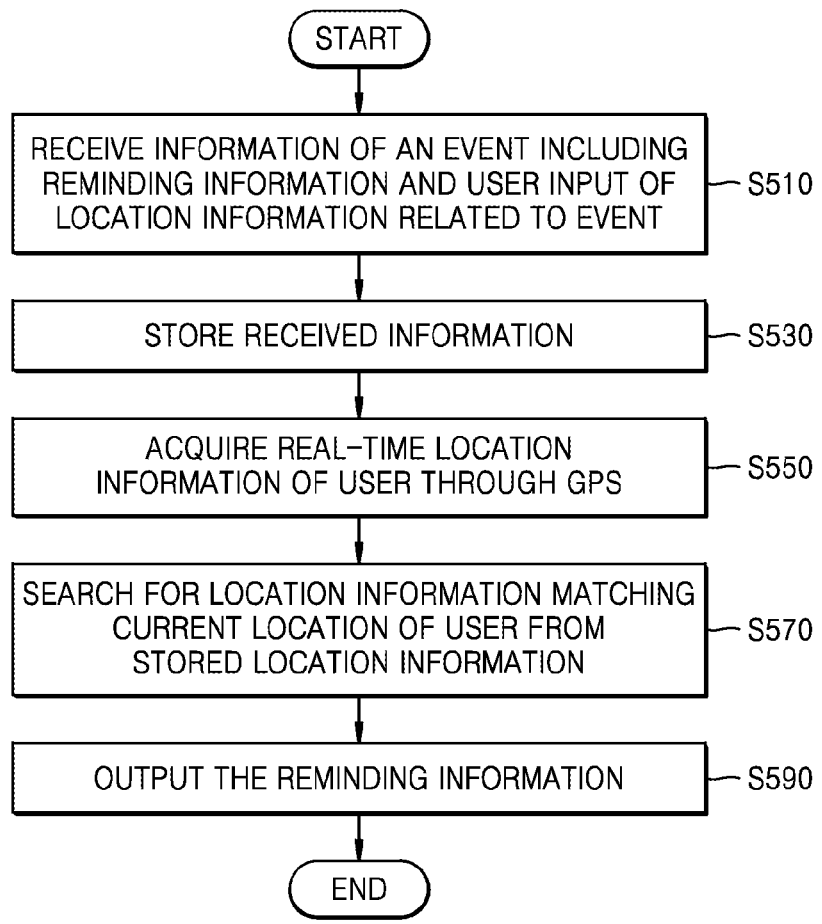
FIG. 5 is a flowchart illustrating a method of reminding about the event based on location information, according to an embodiment of the present disclosure.

FIG. 5 is a flowchart illustrating a method of reminding about the event based on location information, according to an embodiment of the present disclosure.

If predetermined conditions are satisfied, the schedule management device 100 may remind the user about a stored event.

In operation S510, the schedule management device 100 may receive information of the event including reminding information and a user input of location information related to the event.

The reminding information may include at least one of whether to remind, a reminding date and time, a reminding location, a reminding interval, and reminding contents.

Whether to remind refers to whether to remind about the event, the reminding date and time refer to a starting time of the reminding when the reminding is performed, the reminding location refers to information about a location where the reminding is performed, the reminding interval refers to an interval between remindings, and the reminding contents refer to contents output to the user during the reminding.

In operation S530, the schedule management device 100 may store received information.

A series of pieces of information related to the same event may be stored as one record or as connected records in a database.

In operation S550, the schedule management device 100 may acquire real-time location information of the user through the GPS.

The GPS may be mounted to the mobile device or mounted to the schedule management device 100.

The current position of the user may be received in the form of a specific spot or a range.

When received in the form of a range, the schedule management device 100 may acquire a predetermined range such as a range within a radius of 100 m from the current location.

In operation S570, the schedule management device 100 may search for location information matching the current location of the user from the stored location information.

The schedule management device 100 may use various algorithms to match the current location of the user acquired in the form of a range with the stored location information.

In operation S590, when location information matching the current location of the user is found from the stored location information, the schedule management device 100 may output reminding information related to the found location information.

The schedule management device 100 may store a user's work to do when the user passes by a predetermined location and remind the user about the user's work to do when the user actually passes by the predetermined location.

The outputting of reminding information may be performed in various forms such as a message, voice, vibration, and light.

Figure 6:
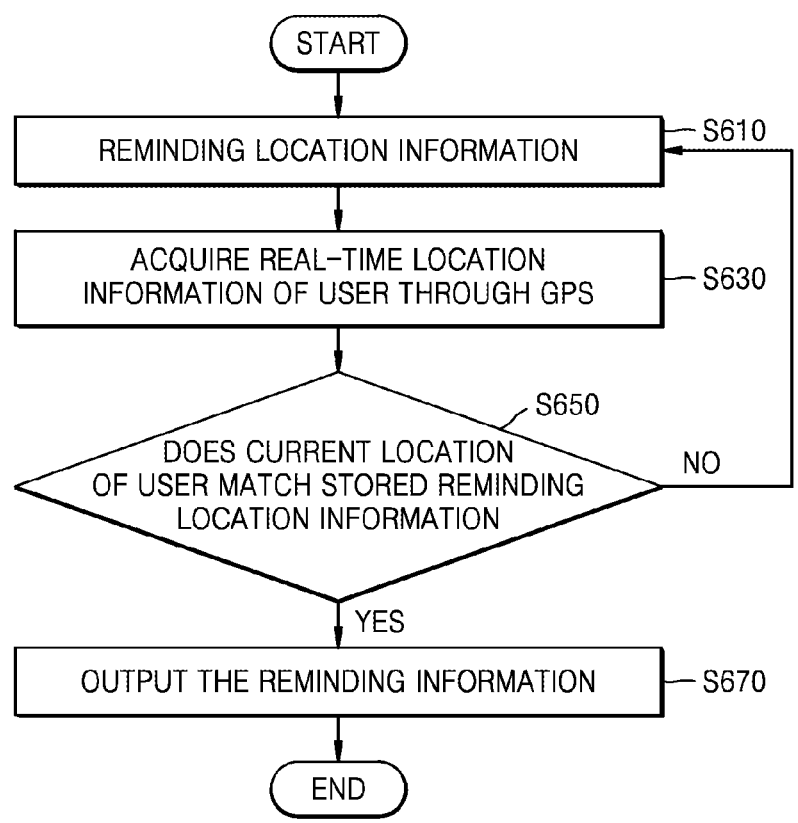
FIG. 6 is a flowchart illustrating a method of performing event reminding in accordance with a real-time location of a user, according to an embodiment of the present disclosure.

FIG. 6 is a flowchart illustrating a method of performing event reminding in accordance with a real-time location of a user according to an embodiment of the present disclosure.

While reminding is performed only based on time according to conventional schedule managements, the schedule management device 100 according to the present embodiment may set reminding based on a location or both a location and time, thereby improving convenience and efficiency of the user's schedule management.

In operation S610, the schedule management device 100 may set reminding location information.

In operation S630, the schedule management device 100 may acquire real-time location information of the user through the GPS.

When the current location of the user matches the stored reminding location information (S650), the schedule management device 100 may output reminding information (S670).

In this regard, when the current location of the user matches the stored reminding location information, the schedule management device 100 may output reminding information about events arranged in the future.

According to an embodiment, when the current location of the user matches the stored reminding location information, the schedule management device 100 may output reminding information regardless of the date and time of the event.

When the current location of the user does not match the stored reminding location information (S650), the schedule management device 100 may reset the reminding location information (S610) or re-acquire location information of the user through the GPS (S630).

According to an embodiment, the schedule management device 100 may also set and output reminding information on the conventional time-based method.

Figure 7:
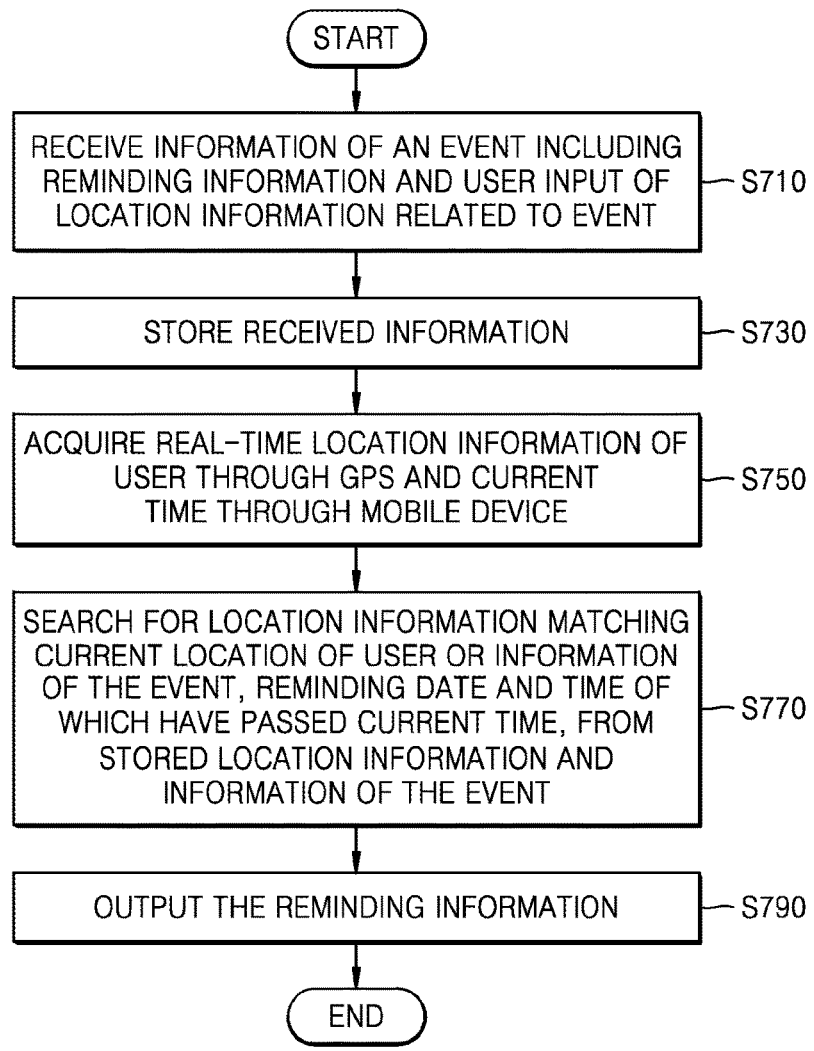
FIG. 7 is a flowchart illustrating a method of reminding about an event based on location information and time information, according to an embodiment of the present disclosure.

FIG. 7 is a flowchart illustrating a method of reminding about an event based on location information and time information, according to an embodiment of the present disclosure.

The schedule management device 100 may remind the user about a stored event on the basis of location and time.

In operation S710, the schedule management device 100 may receive information of the event including reminding information and a user input of location information related to the event.

The schedule management device 100 may include a reminding date and time and reminding location information as information of the event.

The schedule management device 100 may further include whether to remind, reminding interval, reminding contents, and the like as the information of the event.

In operation S730, the schedule management device 100 may store information received from the user.

A series of pieces of information related to the same event may be stored as one record or as connected records in a database.

In operation S750, the schedule management device 100 may acquire real-time location information of the user through the GPS and a current time through the mobile device.

The GPS may be mounted to the mobile device or mounted to the schedule management device 100.

The current position of the user may be received in the form of a specific spot or a range.

When received in the form of a range, the schedule management device 100 may acquire a predetermined range such as a range within a radius of 100 m from the current location.

The current time may indicate information about a current date and time.

In operation S770, the schedule management device 100 may search for location information matching the current location of the user or information of the event, a reminding date and time of which have passed a current time, from the stored location information and information of the event.

The schedule management device 100 may use various algorithms to match the current location of the user acquired in the form of a range with the stored location information.

According to an embodiment, the schedule management device 100 may search for information about an event, a reminding date and time of which have passed a current time, when the stored reminding location includes the current location of the user.

In operation S790, the schedule management device 100 may output the reminding information.

The schedule management device 100 may output the reminding information only when time requirements are satisfied, only when location requirements are satisfied, or only when both time and location requirements are satisfied.

The outputting of reminding information may be performed in various ways such as a message, voice, vibration, and light.

Figure 8:
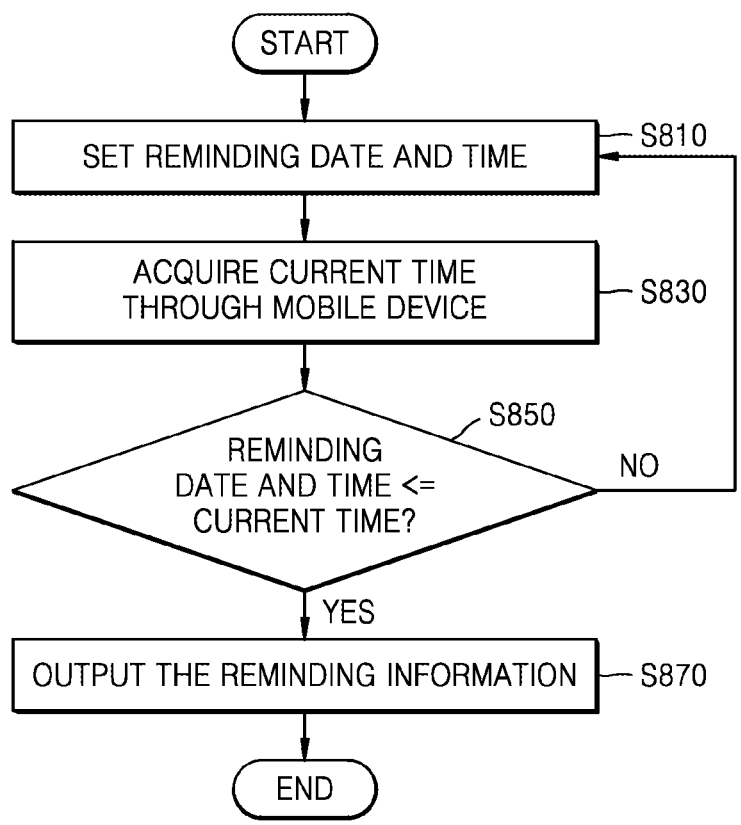
FIG. 8 is a flowchart illustrating a method of performing event reminding in accordance with a real-time location of a user and a current time, according to an embodiment of the present disclosure.

FIG. 8 is a flowchart illustrating a method of performing event reminding in accordance with a real-time location of a user and a current time, according to an embodiment of the present disclosure.

In operation S810, the schedule management device 100 may set a reminding date and time.

The reminding date and time may include a reminding date and a reminding time.

In operation S830, the schedule management device 100 may acquire a current time through the mobile device.

If the current time is the same as the reminding date and time, or if the current time has passed the reminding date and time (S850), the schedule management device 100 may output reminding information (S870).

If the current time has not passed the reminding date and time (S850), the schedule management device 100 may reset the reminding date and time (S810) or re-acquire the current time through the mobile device (S830).

Figure 9:
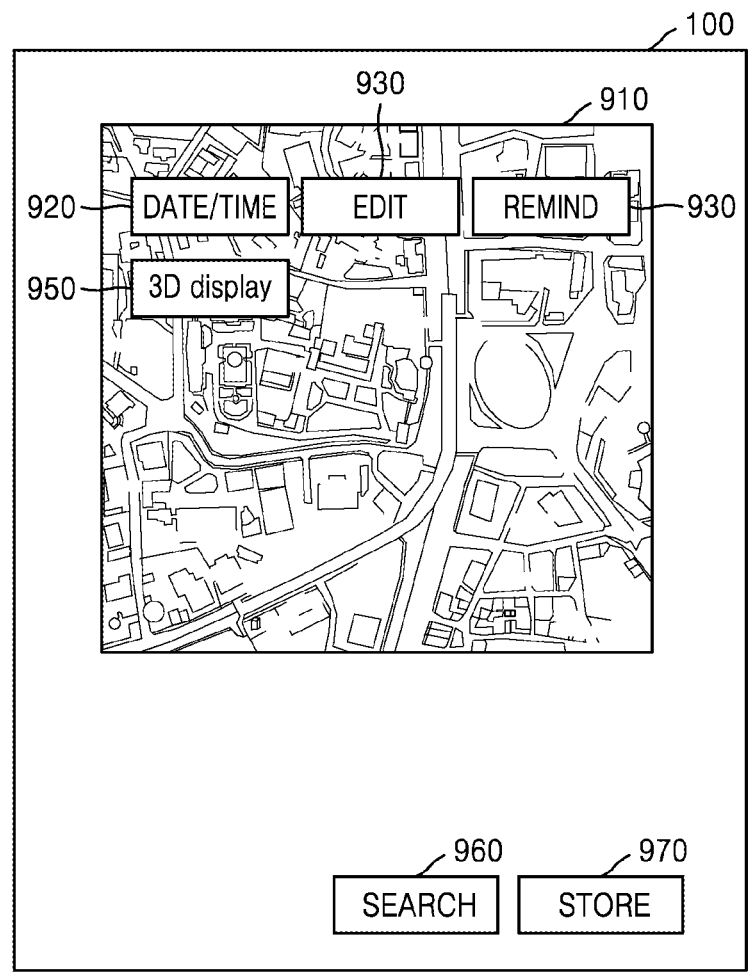
FIG. 9 is a diagram illustrating a graphic user interface (GUI) of a schedule management device according to an embodiment of the present disclosure.

FIG. 9 is a diagram illustrating a GUI of a schedule management device according to an embodiment of the present disclosure.

The schedule management device 100 may receive a location selected by the user on a displayed map 910.

According to an embodiment, upon receiving the location selected by the user on the displayed map 910, the schedule management device 100 may receive a text input such as event contents and preparations therefor by displaying a text input window as a pop-up window.

The schedule management device 100 may change the displayed map into a 3D map by being used a 3D display button 950 and receive a user's selection on the changed map.

The schedule management device 100 may receive date and time information of the event via a date/time button 920.

The schedule management device 100 may receive the title of the event, contents thereof, preparations therefor, reminding contents, and other notes about the event via an EDIT button 930.

In addition, the schedule management device 100 may receive reminding information such as a reminding location and a reminding date and time via a remind button 940.

The schedule management device 100 may store the received information in a database when a store button 970 is clicked.

The schedule management device 100 may search for information by matching the received information with the stored information and output search results thereof via a search button 960.

Figure 10:
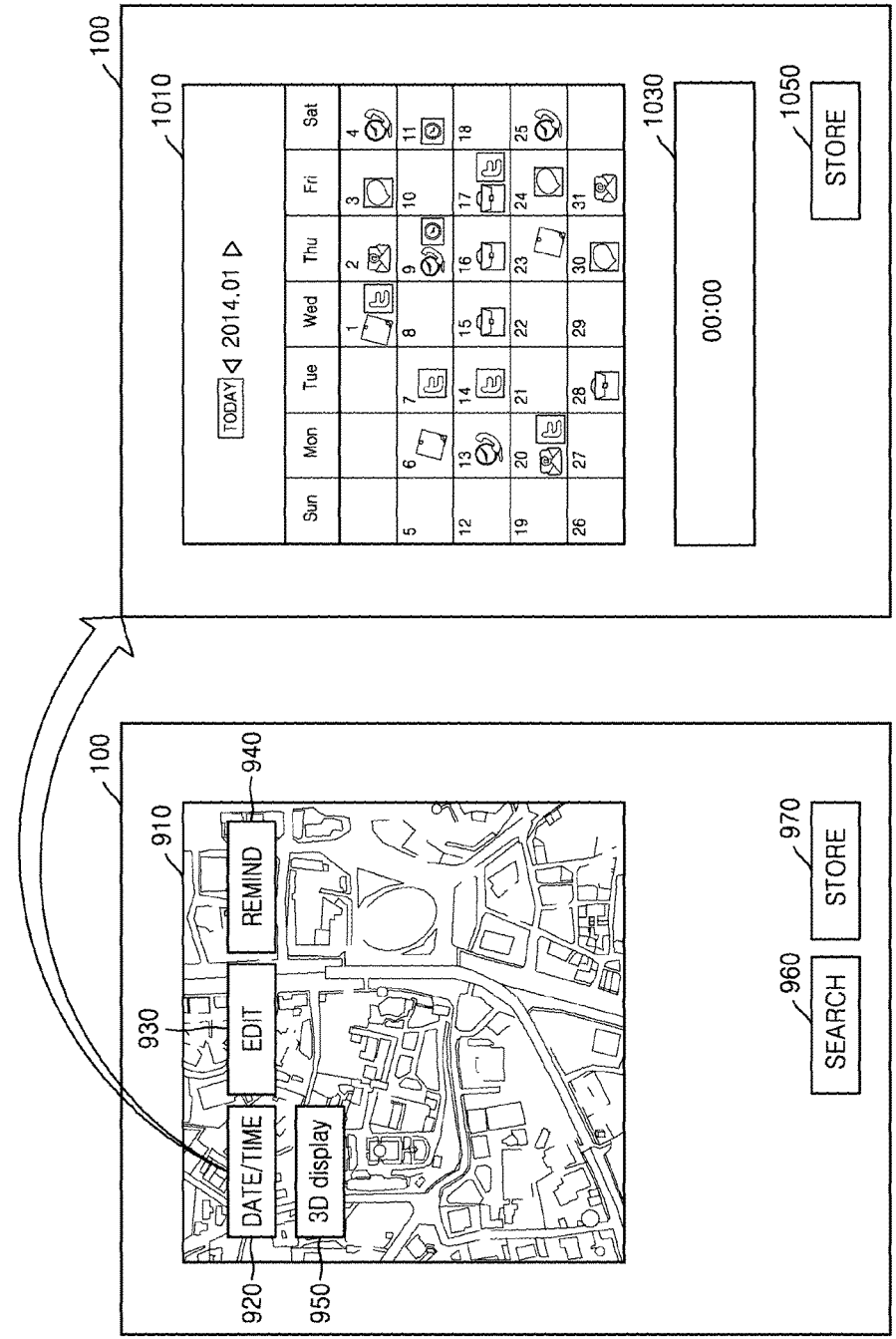
FIG. 10 is a diagram illustrating an example of inputting a date and time of an event in a schedule management device according to an embodiment of the present disclosure.

FIG. 10 is a diagram illustrating an example of inputting a date and time of an event in a schedule management device according to an embodiment of the present disclosure.

The schedule management device 100 may receive date and time information of the event via the date/time button 920.

Upon sensing a click of the date/time button 920, the schedule management device 100 may display a calendar 1010 and a time input window 1030 to receive a user input of the date and time.

The user may select the date of the event on the calendar.

According to an embodiment, when the date of the event is selected on the calendar 1010, the schedule management device 100 may display a pop-up window to receive a text input such as contents of the event and preparations therefor.

The schedule management device 100 may store the received information in a database a store button 1050 is clicked.

Figure 11:
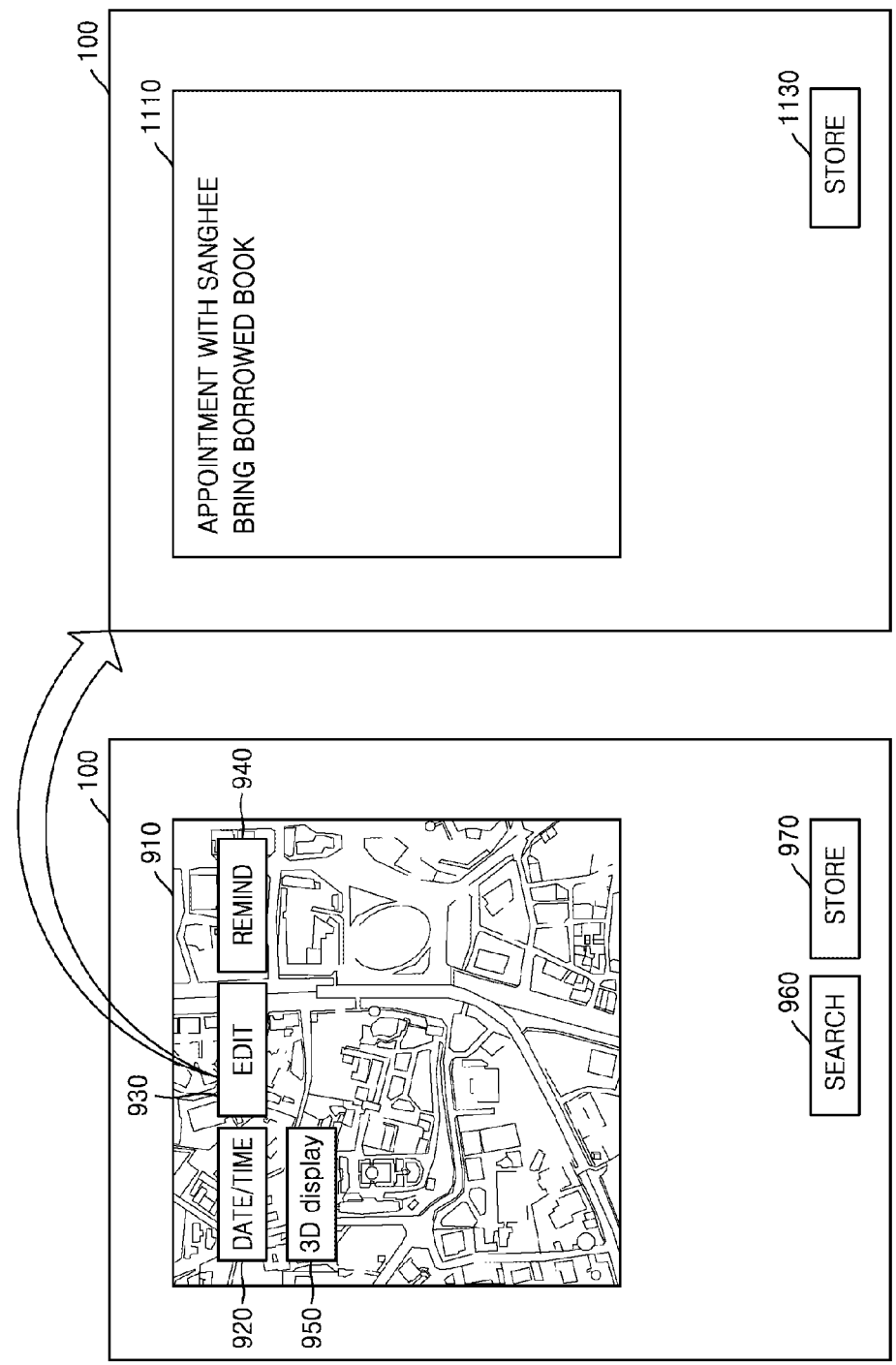
FIG. 11 is a diagram illustrating an example of inputting contents of an event in a schedule management device according to an embodiment of the present disclosure.

FIG. 11 is a diagram illustrating an example of inputting contents of an event in a schedule management device according to an embodiment of the present disclosure.

The schedule management device 100 may receive the title of the event, contents thereof, preparations therefor, reminding contents, and other notes about the event via the EDIT button 930.

Upon sensing a click of the EDIT button 930, the schedule management device 100 may display a text input window 1110 to receive a user input of the event.

The user may freely input information related to the event such as "appointment with Sanghee" and "bring borrowed book" to the text input window 1110.

The user may input a photograph or video captured using the mobile device to the text input window 1110.

The schedule management device 100 may store the received information in a database when a store button 1130 is clicked.

Figure 12:
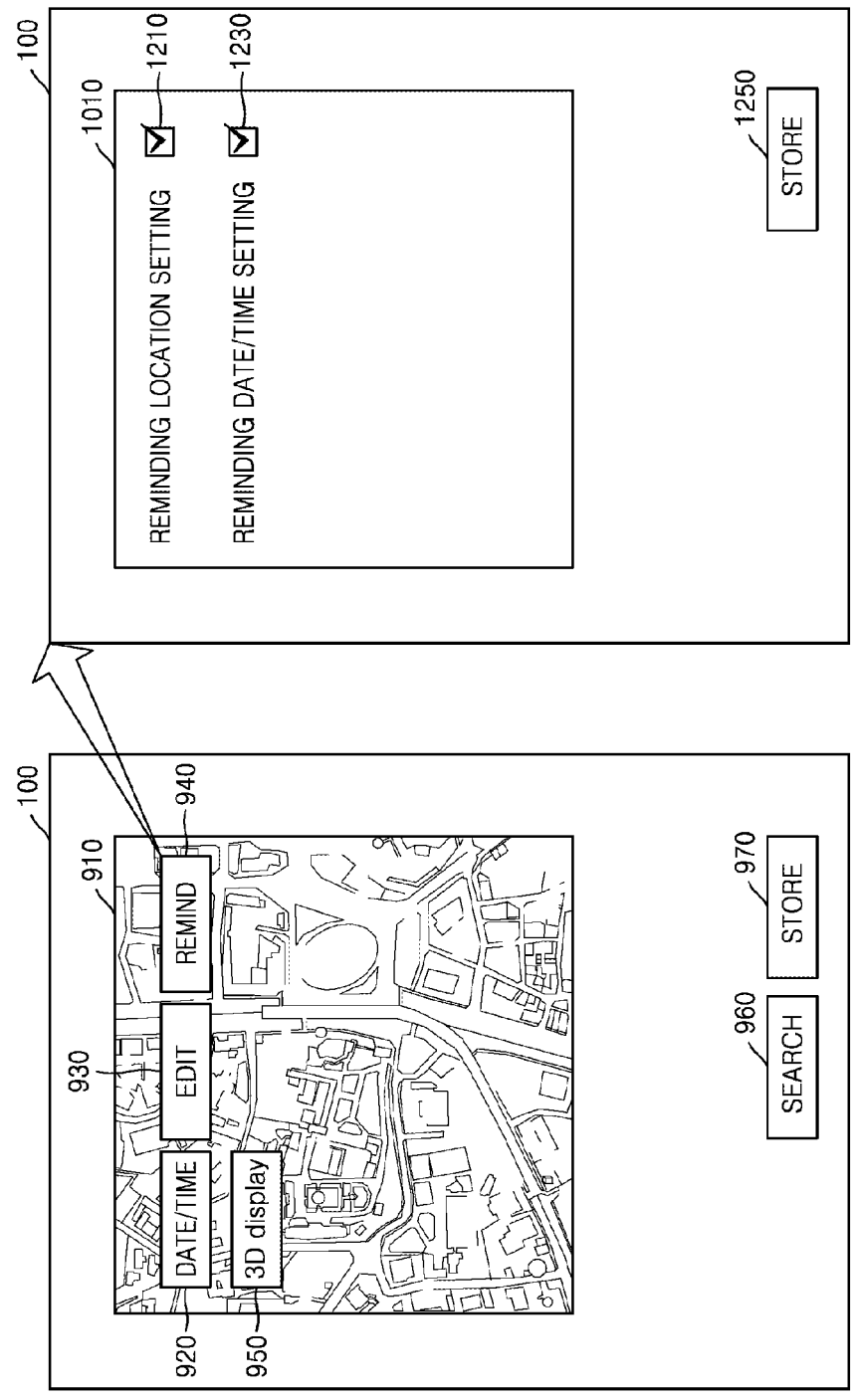
FIG. 12 is a diagram illustrating an example of inputting a reminding location and a reminding date and time in a schedule management device according to an embodiment of the present disclosure.

FIG. 12 is a diagram illustrating an example of inputting a reminding location and a reminding date and time in a schedule management device according to an embodiment of the present disclosure.

The schedule management device 100 may receive reminding information such as the reminding location and the reminding date and time via the remind button 940.

Upon sensing a click of the remind button 940, the schedule management device 100 may display a reminding location setting check box 1210 and a reminding date/time setting check box 1230 to receive a user input for reminding.

When the reminding location setting check box is checked, the schedule management device 100 may display a map as a pop-up window to receive a selection of the reminding location from the user.

In addition, when the reminding date/time setting check box is checked, the schedule management device 100 may display a calendar and a time input window as pop-up windows to receive information about the reminding date and time.

The schedule management device 100 may store the received information in a database when a store button 1250 is clicked.

The schedule management device 100 may output reminding information based on a time, a location, or both the time and location according to whether the reminding location setting check box and the reminding date/time setting check box are checked or not.

Meanwhile, the present disclosure may be implemented through computer readable codes on a non-transitory computer readable recording medium. The non-transitory computer readable recording medium includes all types of storage devices in which data readable by computer systems is stored.

The computer readable code is configured to implement a method of managing a schedule according to an embodiment when it is read and executed by a processor from the non-transitory computer readable recording medium. The computer readable code may be implemented by various programming languages. In addition, functional programs, codes, code segments to implement the embodiments of the present disclosure may be easily programmed by one of ordinary skill in the art.

Examples of the non-transitory computer readable recording medium include ROM, RAM, CD-ROM, magnetic tape, floppy disks, optical data storage devices, and the like, and also include transmission medium implemented using carrier waves (e.g., transmission through the Internet). The non-transitory computer readable recording medium may also be a distributed network, so that the computer readable code may be stored/transferred and executed in a distributed fashion.

The foregoing description of the present disclosure is intended to be illustrative, and those of ordinary skill in the art will understand that the present disclosure may be changed into other specific forms without modifying technical conceptions or essential characteristics according to the present disclosure. Therefore, it is to be understood that the above-described embodiment is to be illustrative rather than definitive. For example, constituent elements described as single units may be implemented as distributed units. Similarly, constituent elements described as distributed units may also be implemented as an integrated unit.

The present disclosure is intended to fall within the scope of the following appended claims rather than within the scope of the detailed description, and accordingly, it must be understood that the meaning and scope of the appended claims and all such changes, modifications and variations induced by their equivalents are included in the scope of the present disclosure.

What is claimed is:

1. A method of managing a schedule in a mobile device, the method comprising:
   receiving information of an event and a first user input of location information related to the event;
   storing the received information of the event and the location information related to the event;
   searching, upon receiving a search criteria as a second user input of only location information via an input interface, for location information matching the search criteria from the stored location information related to the event; and
   if the location information matching the search criteria is found, outputting the information of the event related to the location information found,
   wherein the information of the event comprises a location where a reminder is to be provided, and
   wherein when the received search criteria does not have a constant shape, the searching for the matched location information is performed by replacing the received search criteria with a minimum closed polygon comprising the received search criteria, and searching for location information matching the minimum closed polygon from the stored location information.

2. The method of claim 1,
   wherein the information of the event comprises a date and time of the event,
   wherein the searching further comprises determining whether a current time is a same as the date and time of the event, and
   wherein, if it is determined that the current time is the same as the date and time of the event and the found location information exists, the outputting comprises outputting the information of the event about the found location information.

3. The method of claim 1, wherein the location information related to the event indicates information about a location where the event takes place.

4. The method of claim 1, wherein each of the receiving of the first user input and the receiving of the search criteria are performed by a user using a method of selecting a location on a displayed map or by a method of acquiring a real-time location of the user through a global positioning system (GPS).

5. The method of claim 1, wherein the outputting comprises outputting an activity route for the event on a map.

6. The method of claim 1,
   wherein the information of the event comprises reminding information about the event,
   wherein the search criteria is received via a method of acquiring real-time location information through a global positioning system (GPS), and
   wherein the outputting comprises outputting the reminding information about the event.

7. The method of claim 6, wherein the reminding information about the event indicates information about a location where the reminding information is provided.

8. The method of claim 1,
wherein the information of the event comprises reminding information about the event and information about a reminding date and time,
wherein the search criteria is received via a method of acquiring real-time location information of a user through a global positioning system (GPS),
wherein the searching comprises determining whether a current time has passed the reminding date and time and searching for the information of the event, the stored location information of which matches the acquired real-time location information of the user, and
wherein the outputting comprises outputting the reminding information about the event if the current time has passed the reminding date and time, or if it is determined that the acquired real-time location information of the user matches the stored location information.

9. A schedule management device operating in a mobile device, the schedule management device comprising:
an input interface configured to receive information of an event, a first user input of location information related to the event, and a search criteria as a second user input of only location information;
a memory configured to store the received information of the event and location information related to the event;
at least one processor configured to search, upon receiving the search criteria via the input interface, for location information matching the search criteria from location information stored in the memory; and
an output interface configured to, if the location information matching the search criteria is found, output the information of the event related to the location information found,
wherein the information of the event comprises a location where a reminder is to be provided, and
wherein when the received search criteria does not have a constant shape, the at least one processor is further configured to:
replace the received search criteria with a minimum closed polygon comprising the received search criteria, and
search for location information matching the minimum closed polygon from the stored location information.

10. The schedule management device of claim 9,
wherein the information of the event comprises a date and time of the event,
wherein the at least one processor is further configured to determine whether a current time is a same as the date and time of the event, and
wherein, if it is determined that the current time is the same as the date and time of the event and the searched for location information is found, the output interface is further configured to output the information of the event about the found location information.

11. The schedule management device of claim 9, wherein the location information related to the event indicates information about a location where the event takes place.

12. The schedule management device of claim 9, wherein the first user input and the search criteria are performed by a user using a method of selecting a location on a displayed map or by a method of acquiring a real-time location of the user through a GPS.

13. The schedule management device of claim 9, wherein the output interface is further configured to output an activity route for the event.

14. The schedule management device of claim 9,
wherein the information of the event comprises reminding information about the event,
wherein the search criteria is received via a method of acquiring real-time location information of a user through a global positioning system (GPS), and
wherein the output interface is further configured to output the reminding information about the event.

15. The schedule management device of claim 14, wherein the reminding information about the event indicates information about a location where the reminding information is provided.

16. The schedule management device of claim 9,
wherein the information of the event comprises reminding information about the event and information about a reminding date and time,
wherein the search criteria is received via a method of acquiring real-time location information of a user through a global positioning system (GPS),
wherein the at least one processor is further configured to:
determine whether a current time has passed the reminding date and time, and
search for the information of the event, the stored location information of which matches the acquired real-time location information of the user, and
wherein the output interface is further configured to output the reminding information about the event if the current time has passed the reminding date and time, or if it is determined that the acquired real-time location information of the user matches the stored location information.

17. A non-transitory computer readable recording medium in which a program configured to implement the method of managing a schedule according to claim 1 is recorded.

* * * * *